GEORGE H. REYNOLDS.
Improvement in Car Brakes.

No. 123,840. Patented Feb. 20, 1872.

Witnesses:
A. W. Almqvist
Francis McArdle

Inventor:
George H. Reynolds
per
Attorneys.

123,840

UNITED STATES PATENT OFFICE.

GEORGE H. REYNOLDS, OF PARSONS, KANSAS.

IMPROVEMENT IN CAR-BRAKES.

Specification forming part of Letters Patent No. 123,840, dated February 20, 1872.

Specification describing certain Improvements in Railroad Car-Brakes, invented by GEORGE H. REYNOLDS, of Parsons, in the county of Labette and State of Kansas.

Figure 1:
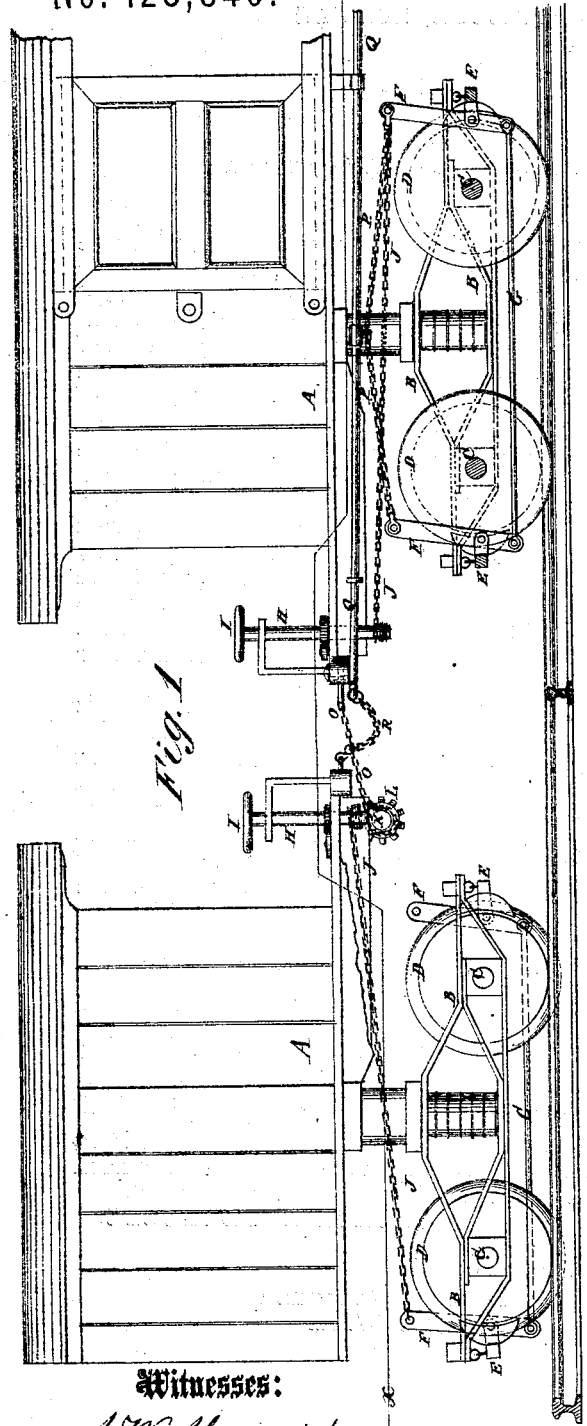
Figure 2:
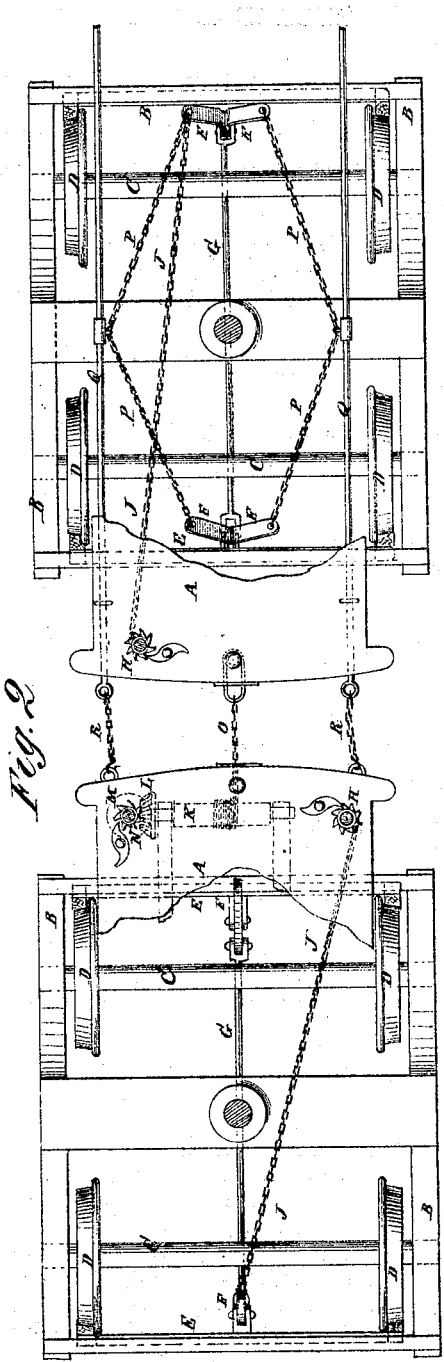

Figure 1 is a side view of the adjacent ends of two cars to which my improved brake has been attached. Fig. 2 is a top view of the same, partly in section, through the line $x\,x$, Fig. 1.

Similar letters of reference indicate corresponding parts.

My invention has for its object to furnish an improved car-brake, which shall be so constructed that the weight of the caboose or rear car of the train may be employed to apply the brakes to all the other cars of the train; and it consists in the construction and combination of the various parts of the device, as hereinafter more fully described.

A represents the bodies of two cars; B are the truck-frames; C are the axles; D are the wheels, and E are the brake-bars, about the construction of which parts there is nothing new. To the front and rear brake-bars of each truck are pivoted short levers F, the lower ends of which are connected by a rod, G. To the platform of each car of the frame is pivoted a shaft, H, to the upper end of which is attached a hand-wheel, I, and to the lower end of which is attached one end of a chain, J, the other end of which is connected with the brake-bars F, so that the brakes may be applied to the said cars in the ordinary manner. In bearings attached to the under side of the platform of the caboose or rear car of the train work the journals of a horizontal shaft, K, to one end of which is attached a bevel-gear wheel, L, the teeth of which mesh into the teeth of a bevel-gear wheel, M, attached to the lower end of the vertical shaft N, which works in bearings attached to the platform, and to the upper end of which is attached a hand-wheel, in the ordinary manner. To the horizontal shaft K is attached one end of a short chain, O, which is wound around the said shaft K, and the other end of which is attached to the bumper-head of the adjacent car in the same manner as an ordinary coupling-link. To the upper ends of the levers F of the brake-bars of all the cars except the last one are attached the ends of two chains, P, the centers of which are drawn outward, and are securely attached to the rods Q. The rods Q extend longitudinally beneath the car-body, and work longitudinally in bearings attached to said car-body. To the ends of the rods Q are attached short chains R, by means of which the rods of the adjacent cars may be connected together. In the case of the next to the last car of the train, the chains R are connected with the platform of the rear car, as shown in Figs. 1 and 2.

When the train is running, the chain O is tightened to receive all the draft strain. By letting out the chains O a little, the draft strain will come upon the chains R and rods Q, and the brakes will be applied to all the cars of the train with the full force required to draw the rear car. The force required to draw the rear car may be increased by applying the brakes to the said rear car in the ordinary manner.

This device is designed especially for freight trains, but may be applied to other trains, if desired.

Having thus described my invention, I claim as new and desire to secure by Letters Patent—

The shaft K and the bumper-head chain O wound around it, the mechanism L M N and chains R R, the rods Q Q and chains P P, combined with the brake mechanism of a train of cars, as and for the purpose described.

GEORGE H. REYNOLDS.

Witnesses:
SAMUEL O. FLETCHER,
EDWARD C. WARD.